United States Patent [19]
Sapiejewski

[11] Patent Number: 4,922,542
[45] Date of Patent: May 1, 1990

[54] HEADPHONE COMFORT

[76] Inventor: Roman Sapiejewski, The Mountain, Framingham, Mass. 01701

[21] Appl. No.: 138,095

[22] Filed: Dec. 28, 1987

[51] Int. Cl.[5] .......................... H04R 1/10; H04M 1/05
[52] U.S. Cl. .......................... 381/187; 381/158
[58] Field of Search .......................... 381/183, 187, 168; 181/129, 130, 135, 198

[56] References Cited

U.S. PATENT DOCUMENTS

| | | | |
|---|---|---|---|
| 1,368,307 | 2/1921 | Waldron | 181/129 |
| 1,586,140 | 5/1926 | Bonnette | 181/129 |
| 2,603,724 | 7/1952 | Kettler | 181/129 |
| 2,989,598 | 6/1961 | Touger et al. | 381/187 |
| 3,112,005 | 11/1963 | Shaw et al. | 181/129 |
| 3,220,505 | 11/1965 | Hargrave | 181/129 |
| 4,006,318 | 2/1977 | Sebesta et al. | 381/158 |
| 4,058,688 | 11/1977 | Nishimura et al. | 381/183 |
| 4,403,120 | 9/1983 | Yoshimi | 381/183 |
| 4,441,576 | 4/1984 | Allen | 181/129 |
| 4,455,675 | 6/1984 | Bose et al. | 381/74 |
| 4,644,581 | 2/1987 | Sapiejewski | 381/74 |

FOREIGN PATENT DOCUMENTS

| | | | |
|---|---|---|---|
| 60-217793 | 10/1985 | Japan | 381/183 |

*Primary Examiner*—Jin F. Ng
*Assistant Examiner*—Danita R. Byrd
*Attorney, Agent, or Firm*—Fish & Richardson

[57] ABSTRACT

A baffle, which supports a driver for converting an input electrical signal into an acoustical output signal, is mounted to a headphone cup via a first cushion which sufficiently spaces the baffle from an outer ear to avoid contact. The baffle defines a front cavity and a rear cavity. A second cushion which forms an oval opening large enough to encompass the outer ear is mounted on the headphone cup for establishing an air seal between the front cavity and a region outside the headphone cup.

14 Claims, 2 Drawing Sheets

HEADPHONE COMFORT

The present invention relates in general to headphoning and more particularly concerns apparatus and techniques for improving the comfort of wearing headphones, which may be of the type disclosed in U.S. Pat. Nos. 4,644,581 and 4,455,675, incorporated herein by reference.

BACKGROUND

According to those inventions, there are means defining a headphone cavity and electroacoustical transducing means, such as a pressure sensitive microphone, within the cavity for providing a signal corresponding to the sum of external noise and the sound produced by the headphone driver in the same cavity. There are means for combining this transduced signal with the input signal desired to be reproduced to produce an error signal representative of the noise and other differences between the input sound signal to be reproduced and the output of the headphone driver in the cavity. Servo means comprising the means for combining comprises means for compensating for these error signals to produce an output acoustical signal at the ear with external noise and distortion significantly reduced and with substantially uniform frequency response between the input to which the signal desired to be reproduced is applied and the ear. These patents disclose a cushion in contact with the ear.

It is an important object of this invention to provide an improved headphone system with improved comfort.

SUMMARY OF THE INVENTION

According to the invention, there is means for supporting the driver and the electroacoustical transducing means so that the assembly is clear of the ear with the driver angularly supported generally parallel to the plane of the pinna. According to another feature of the invention, there is a double annulus circumaural cushion, which may be comprised of highly compliant foam that is either self-skinned or covered in a thin plastic film, or a gelatin-like substance enclosed in a thin plastic film as disclosed in pending application Ser. No. 07/013,339 filed Feb. 11, 1987 now U.S. Pat. No. 4,856,118, incorporated herein by reference. Preferably this cushion is shaped to naturally conform somewhat to the contour of the head prior to compression under the force provided by a supporting headband or helmet.

According to another aspect of the invention, there is an outside cavity behind the driver with a port tuned to prevent the outside cavity from loading the driver at low frequencies (below the port resonance frequency) while not degrading the passive noise attenuation above resonance.

According to another feature of the invention there is sealing means, which may comprise plastic foam, at the boundaries and in the interior of the inside cavity over the entrance to the ear canal with the material at the boundary of the cavity characterized by a high acoustic impedance at low frequencies and a low acoustic impedance at high frequencies with material used in the cavity interior being highly absorptive at high frequencies and essentially transparent to low frequency energy. Headphone apparatus according to the invention may comprise a baffle and a driver supported by the baffle for converting an input electrical signal into an acoustical output signal and having a vibratile diaphragm with a front and rear. A structure bounds a front cavity receiving acoustic energy from the front of the diaphragm which structure bounds a portion of a rear cavity for receiving acoustic energy from the rear of the diaphragm wherein the structure includes a closed cell foam member and an open cell foam member. This structure helps control the transmission of acoustic energy between the rear and front cavities. A headphone cup is attached to this structure. A cushion having an opening large enough to encompass the outer ear is mounted on the headphone cup for establishing a seal between the front cavity and a region outside the headphone apparatus. The headphone cup bounds the remainder of the rear cavity and helps control transmission of acoustic energy between the diaphragm rear and the air outside the headphone apparatus.

Numerous other features, objects and advantages of the invention will become apparent from the following specification when read in connection with the accompany drawings in which:

DETAILED DESCRIPTION

Figure 1:
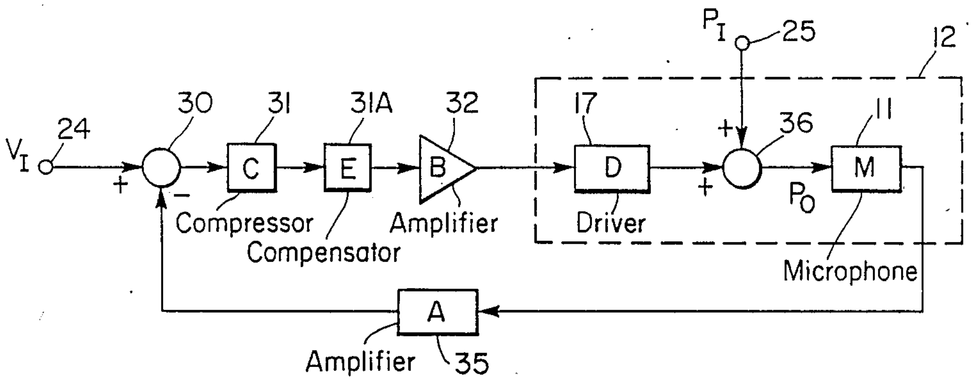
FIG. 1 is a block diagram illustrating a system embodying the invention.

With reference to the drawing and more particularly FIG. 1 thereof, there is shown a block diagram illustrating the logical arrangement of a system incorporating the invention corresponding substantially to FIG. 1 of the aforesaid '581 patent. A signal combiner 30 algebraically combines the signal desired to be reproduced by the headphone on input terminal 24 with a feedback signal provided by microphone preamplifier 35. Signal combiner 30 provides the combined signal to compressor 31 which limits the level of the high level signals. The output of compressor 31 is applied to compensator 31A. Compensator 31A includes compensation circuits to insure that the open loop gain meets the Nyquist stability criteria, so that the system will not oscillate when the loop is closed. The system shown is duplicated once each for the left and right ears.

Power amplifier 32 amplifies the signal from compensator 31A and energizes headphone driver 17 to provide an acoustical signal in cavity 12 that is combined with an outside noise signal that enters cavity 12 from a region represented as acoustical input terminal 25 to produce a combined acoustic pressure signal in cavity 12 represented as a circle 36 to provide a combined acoustic pressure signal applied to and transduced by microphone 11. Microphone amplifier 35 amplifies the transduced signal and delivers it to signal combiner 30.

Figure 2:
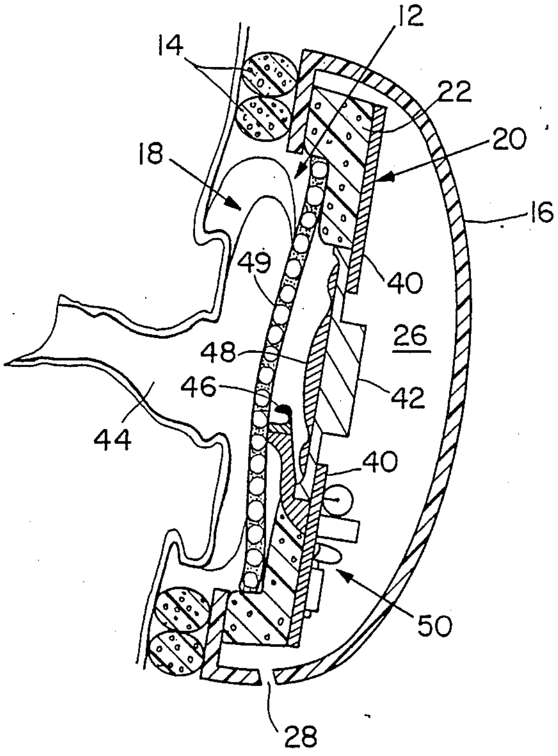
FIG. 2 is a diagrammatical representation partially in section of a headphone on the ear according to the invention.

Referring to FIG. 2, there is shown a diagrammatical representation, partially in section, of a headphone on the ear according to the invention. A double annulus circumaural cushion 14, which may comprise highly compliant foam either self-skinned or covered in a thin plastic film, is mounted on headphone cup 16. Cushion 14 is formed with an oval opening surrounding outer ear 18. Outer ear then faces baffle assembly 20, which is recessed in headphone cup 16 so as to avoid contact with ear 18. Closed-cell foam 22 mechanically isolates baffle assembly 20 from the headphone cup 16. Baffle assembly 20 and foam 22 separate front cavity 12 from rear cavity 26. Port 28 in headphone cup 16 vents rear cavity 26.

Baffle assembly 20 comprises a rigid circuit board 40 having a drive unit 42 seated in a centered opening adjacent to ear canal 44 and sensing microphone buffering circuitry 50. Front cavity 12 accommodates microphone 46 adjacent to diaphragm 48 of drive unit 42. Microphone 46 has a vibratile membrane spaced from the diaphragm axis with its plane generally parallel to the diaphragm axis and generally perpendicular to the plane of diaphragm 48 and comprises transducing means adjacent to drive unit 42 in front cavity 12.

A layer of open cell foam 49 covers components supported on the baffle and is located between these components and the ear to provide intracavity damping.

For active noise reduction drive unit 42 must be capable of producing at least the sound-pressure level of ambient noise to be canceled entering front cavity 12. For a given driver diaphragm displacement a small front cavity 12 and large rear cavity 26 enhances establishing high sound pressure levels in the front cavity. Acoustically isolating front cavity 12 and rear cavity 26 by a structure, comprised of closed cell foam 22 and open cell foam 49, prevents rear radiation from drive unit 42 from canceling the front radiation at low frequencies.

It is also important for the sensing microphone to be as near to the ear canal as practical so that the cancellation effect produced at the sensing microphone is substantially the same as that at the ear drum.

In a feedback system of the type described in the aforementioned patents, the time delay between sensing microphone 46 and drive unit 42 is preferably as small as practical for stability reasons. This result may be achieved by positioning drive unit 42 and sensing microphone 46 as close together as practical and making diaphragm 48 of reasonably small diameter. If the diaphragm diameter were large, there would be significant delay for the sound emanating from near an edge of the diaphragm furthest from the sensing microphone to reach the sensing microphone. The structure disclosed in the aforementioned prior art patents meet these preferred conditions by mounting the various components in a baffle that rested directly on the ear.

In this prior art structure of the aforementioned prior art U.S. Pat. Nos. 4,455,675 and 4,644,581 there is disclosed a small hole in a sheet of closed cell foam resting on the pinna coupling the drive unit and microphone to the ear canal, thereby forming a small front cavity. The remainder of the ear cup provides a relatively large rear cavity with the closed cell foam isolating the front cavity from the rear cavity. Acoustical performance depended somewhat upon the precise position of the foam-covered baffle on the pinna. Small changes in position can significantly affect the coupling to the ear canal; and, hence, the overall system frequency response and performance. Furthermore, the prolonged use of that structure produced discomfort from the foam resting directly on the pinna.

The structure according to the present invention still positions drive unit 42 and sensing microphone 46 in close proximity to the ear canal without resting on the pinna. The closed-cell foam 22 together with the rigid baffle 20 maintains isolation between front cavity 12 and rear cavity 26 to prevent cancellation of low frequencies in the front cavity produced by diaphragm 46.

This arrangement is significantly less critical than the structure in the aforementioned patents as to head placement by omitting a small cavity that must align exactly with the ear canal entrance. Furthermore, the soft closed cell foam of the ear cushion 14 seals well to the head, establishing a well-defined front cavity for receiving radiation from drive unit 42. The result is a more consistent frequency response from wearer-to-wearer; and, hence, a more consistent feedback performance.

The invention has a larger front cavity than the systems described in the aforementioned patents. Adequate sound pressure levels may be established by using a slightly larger drive unit. This drive unit is still small enough so that the time delay for sounds traveling between the diaphragm 48 and sensing microphone 46 does not cause any significant reduction in bandwidth of the feedback loop. Using the printed circuit board 40 for the sensing microphone buffering circuitry 50 as the mounting baffle for drive unit 42 minimizes space requirements.

Port opening 28 provides a mass for resonating with the compliance of the air in rear cavity 26. For frequencies above this resonance, rear cavity 26 acts as if it were entirely sealed. Below this resonant frequency, rear cavity 26 acts as if it were open to the surrounding environment and thereby provides a rear cavity of effectively infinite volume to drive unit 42 for frequencies below this resonance. For many applications the volume of rear cavity 26 may be sufficiently large so that port 28 is unnecessary. It may be desirable to omit port 28 to avoid a reduction in passive attenuation.

Figure 3:
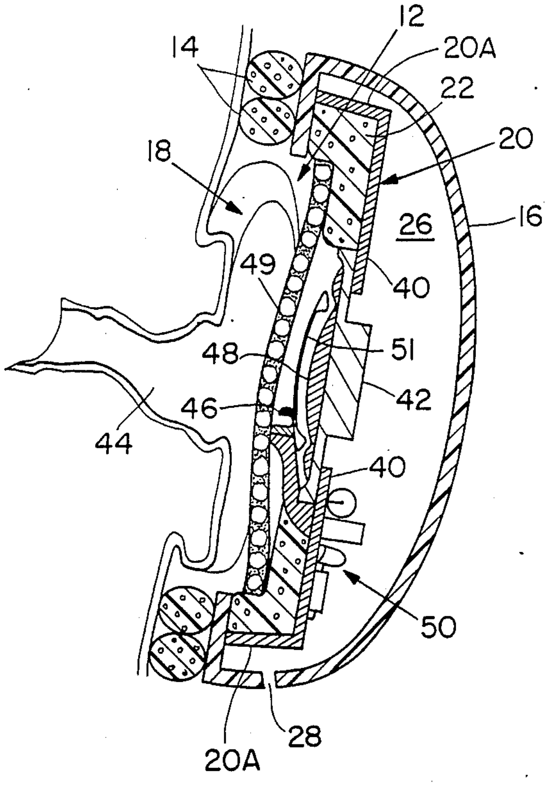
FIG. 3 is a diagrammatical representation partially in section of a modification of the embodiment of FIG. 2.

Referring to FIG. 3, there is shown a diagrammatical representation partially in section of a headphone on the ear according to the invention representing a modification of the structure of FIG. 2. Corresponding elements are identified by the same reference numeral in FIGS. 2 and 3 and will not be further described in the description of FIG. 3. Baffle 20 is formed with an extension 20A rigidly connected to cup 16. A protective structure 51 over driver diaphragm 48 limits driver diaphragm excursion to prevent damage. The driver diaphragm could be damaged when the headphones are abruptly removed from the head to remove the restoring force provided by the enclosed air.

The structural arrangement described above has a number of advantages. The drive unit and sensing microphone remain in close proximity to the ear canal without resting on the outer ear. The discomfort due to direct contact is thereby avoided. Moreover, the soft closed-cell foam of the concentric outer ear surround cushions mounted to the headphone cup is comfortable to the user and seals well to the head, giving a repeatable, well-defined front cavity. This consistency contributes to a more consistent frequency response from wearer to wearer; and, hence, a more consistent feedback performance. The larger front cavity also eliminates the critical alignment of a small front cavity with the ear canal entrance.

There has been described novel apparatus and techniques for effecting a marked improvement in headphone comfort. It is evident that those skilled in the art may now make numerous uses and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Headphone apparatus comprising, a baffle, a driver supported by said baffle for converting an input electrical signal into an acoustical output signal and having a vibratile diaphragm with a front and a rear, a structure bounding a front cavity receiving acoustic energy from the front of said diaphragm and said structure bounding a portion of a rear cavity which rear cavity is for receiving acoustic energy from the rear of said diaphragm, said structure comprising means for controlling the transmission of acoustic energy between said rear and front cavities, a headphone cup attached to said structure and bounding the remainder of said rear cavity and comprising means for controlling transmission of acoustic energy between the diaphragm rear and air outside said apparatus, and a cushion having an opening large enough to encompass the outer ear, mounted on the headphone cup for establishing a seal between the front cavity and a region outside said apparatus.

2. Headphone apparatus in accordance with claim 1 wherein said means for controlling comprises a port in said headphone cup for allowing air outside the headphone apparatus to communicate with the rear cavity for resonating with the compliance of air in the rear cavity.

3. Headphone apparatus in accordance with claim 1 wherein said cushion is a double annulus circumaural cushion.

4. Headphone apparatus in accordance with claim 1 wherein the front cavity is sufficiently isolated from the rear cavity to avoid cancellation of low frequencies radiated by the diaphragm into the front cavity.

5. Headphone apparatus in accordance with claim 3 wherein said cushion comprises highly compliant foam that is self-skinned.

6. Headphone apparatus in accordance with claim 4 wherein said cushion comprises highly compliant foam in a thin plastic film.

7. Headphone apparatus in accordance with claim 1 and further comprising, electroacoustical transducing means closely adjacent to said driver in said front cavity for transducing an acoustical pressure signal into a corresponding transduced electrical signal and located near the ear canal entrance so that said transducing means is responsive to the pressure in the front cavity near the ear canal entrance.

8. Headphone apparatus in accordance with claim 7 wherein said means for controlling comprises a port in said headphone cup for allowing air outside the headphone apparatus to communicate with the rear cavity for resonating with the compliance of air in the rear cavity.

9. Headphone apparatus in accordance with claim 7 wherein said cushion is a double annulus circumaural cushion.

10. Headphone apparatus in accordance with claim 8 wherein the front cavity is sufficiently isolated from the rear cavity to avoid cancellation of low frequencies radiated by the diaphragm into the front cavity.

11. Headphone apparatus in accordance with claim 9 wherein said cushion comprises highly complaint foam that is self-skinned.

12. Headphone apparatus in accordance with claim 10 wherein said cushion comprises highly compliant foam in a thin plastic film.

13. Headphone apparatus in accordance with claim 1 wherein said cushion is characterized by a high acoustic impedance at low frequencies and a low acoustic impedance at high frequencies and wherein, the structure is comprised of a material that is highly absorptive at high frequencies and essentially transparent to low frequency enegy.

14. Headphone apparatus in accordance with claim 7 wherein said cushion is characterized by a high acoustic impedance at low frequencies and a low acoustic impedance at high frequencies and wherein, the structure is comprised of a material that is highly absorptive at high frequencies and essentially transparent to low frequency energy.

* * * * *